United States Patent
Bon et al.

(10) Patent No.: US 12,409,776 B2
(45) Date of Patent: Sep. 9, 2025

(54) METHOD FOR WARNING OF HAZARDOUS OPERATING CONDITIONS OF A VEHICLE

(71) Applicant: Volvo Truck Corporation, Gothenburg (SE)

(72) Inventors: Philippe Bon, St Bonnet de Mure (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 144 days.

(21) Appl. No.: 18/496,044

(22) Filed: Oct. 27, 2023

(65) Prior Publication Data

US 2024/0149782 A1    May 9, 2024

(30) Foreign Application Priority Data

Nov. 7, 2022   (EP) .................................... 22205766

(51) Int. Cl.
  *B60Q 1/52*   (2006.01)
  *G06V 20/58*  (2022.01)
(52) U.S. Cl.
  CPC ............. *B60Q 1/52* (2013.01); *G06V 20/582* (2022.01); *B60Y 2200/142* (2013.01)
(58) Field of Classification Search
  CPC ...... B60Q 1/46; B60Q 1/52; B60Y 2200/142; G06V 20/582
  See application file for complete search history.

(56) References Cited

U.S. PATENT DOCUMENTS

| | | | | |
|---|---|---|---|---|
| 11,565,699 B1* | 1/2023 | Ravella | ............... | B60W 30/143 |
| 2013/0041557 A1* | 2/2013 | Endo | ..................... | B62D 6/002 |
| | | | | 701/42 |
| 2018/0015874 A1 | 1/2018 | Peardon | | |
| 2019/0176687 A1* | 6/2019 | Nagata | .................. | B60W 40/13 |
| 2019/0359125 A1 | 11/2019 | Nagata | | |
| 2022/0105953 A1* | 4/2022 | Osagawa | ............ | B60W 40/076 |
| 2022/0348227 A1 | 11/2022 | Foster et al. | | |

FOREIGN PATENT DOCUMENTS

| | | |
|---|---|---|
| CN | 111204278 A | 5/2020 |
| EP | 3180210 A1 | 6/2017 |

OTHER PUBLICATIONS

Extended European Search Report for European Patent Application No. 22205766.3, mailed Aug. 17, 2023, 9 pages.

* cited by examiner

*Primary Examiner* — Omer S Khan
(74) *Attorney, Agent, or Firm* — Withrow & Terranova, PLLC

(57) ABSTRACT

A computer-implemented method for warning road users of a hazardous operating condition of a heavy-duty vehicle. The method comprises obtaining, by a processor device of a computer system, a speed limit interval associated with a road on which a heavy-duty vehicle is travelling, and wherein the speed limit interval is based on a speed limit of the road; determining, by the processor device, that a travelling speed of the heavy-duty vehicle is outside the speed limit interval; determining, by the processor device, that a travelling angle of the heavy-duty vehicle and/or of the road on which the heavy-duty vehicle is travelling is outside a predetermined travelling angle range; and automatically controlling, by the processor device, the vehicle hazard lights of the heavy-duty vehicle based on the travelling speed and the travelling angle.

17 Claims, 7 Drawing Sheets

METHOD FOR WARNING OF HAZARDOUS OPERATING CONDITIONS OF A VEHICLE

PRIORITY APPLICATIONS

The present application claims priority to European Patent Application No. 22205766.3, filed on Nov. 7, 2022, and entitled "METHOD FOR WARNING OF HAZARDOUS OPERATING CONDITIONS OF A VEHICLE," which is incorporated herein by reference in its entirety.

TECHNICAL FIELD

The disclosure relates generally to vehicles. In particular aspects, the disclosure relates to a computer-implemented method of warning road users of a hazardous operating condition of a vehicle. The disclosure can be applied in heavy-duty vehicles, such as trucks, buses, and construction equipment. The disclosure can be used in autonomous vehicles, as well as in driver controlled vehicles. Although the disclosure may be described with respect to a particular vehicle, the disclosure is not restricted to any particular vehicle.

BACKGROUND

Vehicles are equipped with hazard lights which can be engaged by the driver to give a warning to other drivers. This may for example be the case when the vehicle comes to a halt in emergency situations or if the vehicle represents an unforeseen obstacle at critical locations, such as behind a blind bend. The location of the switch for turning on the hazard lights is not standardized in vehicles or trucks and varies among different vehicle brands. As the driver may not need the hazard light frequently, it might be difficult for the driver to find the switch in an emergency case, wasting valuable seconds for timely warning of other drivers, thus increasing the risk of an accident. Moreover, it may be difficult for the driver to determine during what conditions the hazard lights are needed.

There is thus a need for improved methods for warning road users of a hazardous operating condition of the vehicle.

SUMMARY

According to a first aspect of the disclosure, a computer system comprising a processor device is provided. The processor device is configured to obtaining, by a processor device of a computer system, a speed limit interval associated with a road on which a heavy-duty vehicle is travelling, and wherein the speed limit interval is based on a speed limit of the road, and determining, by the processor device, that a travelling speed of the heavy-duty vehicle is outside the speed limit interval. The method further comprises determining, by the processor device, that a travelling angle of the heavy-duty vehicle and/or of the road on which the heavy-duty vehicle is travelling is outside a predetermined travelling angle range, and automatically controlling, by the processor device, vehicle hazard lights of the heavy-duty vehicle based on the travelling speed and the travelling angle.

The first aspect of the disclosure may seek to solve the problem of the driver not knowing when to turn on and off the hazard lights of the vehicle. A technical benefit may include achieving a method for automatically controlling the hazard lights that gathers information to provide a robust and secure automation of the hazard lights. This is achieved by the first aspect of the disclosure.

According to a second aspect, a computer-implemented method for warning road users of a hazardous operating condition of a heavy-duty vehicle is provided. The method comprises obtaining by a processor device of a computer system, a speed limit interval associated with a road on which a heavy-duty vehicle is travelling, and wherein the speed limit interval is based on a speed limit of the road, and determining, by the processor device, that a travelling speed of the heavy-duty vehicle is outside the speed limit interval. The method further comprises determining, by the processor device, that a travelling angle of the heavy-duty vehicle and/or of the road on which the heavy-duty vehicle is travelling is outside a predetermined travelling angle range, and automatically controlling, by the processor device, said vehicle hazard lights of the heavy-duty vehicle based on the travelling speed and the travelling angle.

In some examples, wherein upon determining that the travelling speed of the heavy-duty vehicle is outside the speed limit interval and the travelling angle is outside a predetermined travelling angle range, the automatically controlling the vehicle hazard lights comprises activating said vehicle hazard lights. A technical benefit may include warning other drivers on the road of a deviant speed of the heavy-duty vehicle. Further, the driver need not actively decide when to turn on the vehicle hazard lights thus allowing the driver to focus on other aspects of the driving.

In some examples, wherein the vehicle hazard lights are kept active as long as the travelling speed of the heavy-duty vehicle is outside the speed limit interval and the travelling angle is outside a predetermined travelling angle range. A technical benefit may include providing a continuous warning to other drivers until the vehicle is at a speed that is more similar to other vehicles on the road.

In some examples, wherein upon determining that the travelling speed of the heavy-duty vehicle is inside the speed limit interval and/or the travelling angle is inside a predetermined travelling angle range, automatically controlling the vehicle hazard lights comprises deactivating the vehicle hazard lights. A technical benefit may include providing a warning system that is deactivated once it is no longer needed. Further, the driver need not actively decide when to turn off the vehicle hazard lights thus allowing the driver to focus on other aspects of the driving.

In some examples, the method further comprises obtaining the speed limit of the road. A technical benefit may include receiving the information of the current speed limit of the road on which the vehicle is travelling.

In some examples, wherein said obtaining of the speed limit of the road comprises capturing and processing images of the road sign for determining the speed limit of the road. A technical benefit may include receiving the information of the current speed limit of the road on which the vehicle is travelling in an accurate manner.

In some examples, wherein said obtaining of the speed limit of the road comprises receiving the speed limit of the road from a navigation service. A technical benefit may include receiving the information of the current speed limit of the road on which the vehicle is travelling in an accurate manner.

In some examples, wherein the travelling angle is a pitch angle of the heavy-duty vehicle in a travelling direction of the heavy-duty vehicle, and wherein the predetermined travelling angle range is a predetermined pitch angle range.

In some examples, wherein the speed limit interval is based on the speed limit of the road, the travelling angle range, ambient conditions of the vehicle and/or condition of the road. A technical benefit may include providing a warning system that takes many aspects of the road into account, thus providing a more accurate control of the vehicle hazard lights. For example, the speed limit interval may be smaller during difficult road conditions and/or in very steep inclinations.

In some examples, wherein the travelling angle range is based on the speed limit of the road, the speed limit interval, ambient conditions of the vehicle and/or condition of the road. A technical benefit may include providing a warning system that takes many aspects of the road into account, thus providing a more accurate control of the vehicle hazard lights. For example, the travelling angle range may be smaller during difficult road conditions and/or in very steep inclinations.

In some examples, the method further comprises obtaining information relating to the road, ambient conditions and/or time. A technical benefit may include providing a warning system that takes many aspects of the road into account, thus providing a more accurate control of the vehicle hazard lights.

In some examples, said automatically controlling the vehicle hazard lights of the heavy-duty vehicle is based on the travelling speed and the travelling angle as well as on the obtained information relating to the road, ambient condition and/or time. A technical benefit may include providing a warning system that takes many aspects of the road into account, thus providing a more accurate control of the vehicle hazard lights.

In some examples, the travelling angle range is −3 to +3%.

In some examples, the travelling angle range is −7 to +7%.

In some examples, the speed limit interval is asymmetrical around the speed limit.

In some examples, the range of the speed limit interval depends on the travelling speed and/or the travelling angle. A technical benefit may include providing a warning system that takes many aspects into account, thus providing a more accurate control of the vehicle hazard lights.

In some examples, the range of the travelling angle range depends on the travelling speed and/or the travelling angle. A technical benefit may include providing a warning system that takes many aspects into account, thus providing a more accurate control of the vehicle hazard lights.

According to a third aspect, a heavy-duty vehicle comprising a processing device configured to perform the method according to the second aspect is provided.

The third aspect of the disclosure may seek to solve the problem of the driver of the heavy-duty vehicle not knowing when to turn on and off the hazard lights of the vehicle. A technical benefit may include achieving a method for automatically controlling the hazard lights that gathers information to provide a robust and secure automation of the hazard lights.

According to a fourth aspect, a program product comprising program code for performing, when executed by a processing device, the method according to the second aspect is provided.

According to a fifth aspect, a control system comprising one or more control units is provided. The one or more control units are configured to perform the method according to the second aspect.

According to a sixth aspect, a non-transitory computer-readable storage medium is provided. The non-transitory computer-readable storage medium comprises instructions, which when executed by the processor device, cause the processor device to perform the method of the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
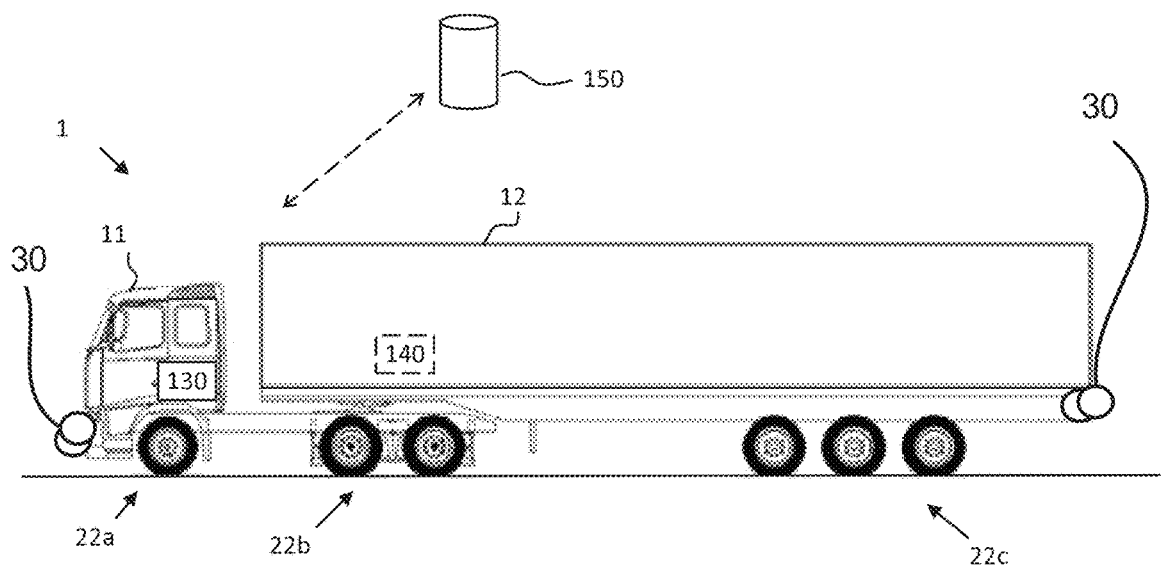
FIG. 1 is an exemplary view of a heavy-duty vehicle according to one example.

FIG. 1 illustrates a heavy-duty vehicle 1. This particular example comprises a tractor unit 110 which is arranged to tow a trailer unit 12. The tractor 11 comprises a vehicle control unit (VCU) 130 arranged to control various functions of the vehicle 1. For instance, the VCU may be arranged to perform a vehicle motion management (VMM) function comprising control of wheel slip, vehicle unit stability, and so on. The trailer unit 12 optionally also comprises a VCU 140, which then controls one or more functions on the trailer 12. The VCU or VCUs may be communicatively coupled, e.g., via wireless link, to a remote server 150. This remote server may be arranged to perform various configurations of the ECU, and to provide various forms of data to the ECU 130, such as for example providing data regarding the make and type of tires mounted on the vehicle 1.

The vehicle combination 1 may of course also comprise additional vehicle units, such as one or more dolly units and more than one trailer unit. Although the vehicle is illustrated as a tractor unit, it should be realized that other types of vehicles may be equally considered for the purpose of the herein described method such as busses, construction equipment, trucks, etc.

The vehicle 1 is supported by wheels 22, where each wheel comprises a tire. The tractor unit 11 has front wheels 22a which are normally steered, and rear wheels 22b of which at least one pair are driven wheels. Generally, the rear wheels of the tractor 11 may be mounted on tag or pusher axles. A tag axle is where the rear-most drive axle is non-powered, also referred to as a free-rolling or dead axle. A pusher axle is where the forward-most drive axle is not powered. The trailer unit 12 is supported on trailer wheels 22c. Trailers with driven wheels, and even a steered axle, are also possible.

One of the rear axles and/or one of the axles on the trailer 12 may be a liftable axle. A lift axle, also known as a retractable axle, is an axle which can be raised so that its tires are not touching the road surface. This improves fuel economy and reduces maintenance and tire wear. It may also reduce or increase dynamic stability features of the vehicle and it can increase or decrease road wear depending on vehicle load, which axles that are lifted and in which driving situation the axle is lifted. One or more of the wheels may also be mounted with an active suspension which may be controlled by the VCU 130, 140, e.g., in order to adjust a normal force of one or more tires.

The vehicle 1 further comprises at least one vehicle hazard light 30. Preferably, the vehicle 1 comprises a plurality of hazard lights 30. In one example, two hazard lights are arranged in the front of the vehicle 1 and two hazard lights are arranged in the back of the vehicle. Preferably, the vehicle hazard lights 30 are arranged such that other drivers on the road 20 easily can see them. In the exemplary embodiment of FIG. 1, at least two hazard lights are arranged in the tractor 11, and at least two hazard lights are arranged in the end portion of the trailer 12.

As is known to a person skilled in the art, vehicle hazard lights 30 are special lights that flash on and off and are used to warn other drivers. A hazard light may also be referred to as an emergency light or warning lights.

In addition to hazard lights 30, the vehicle may comprise other external lights (not shown) such as vehicle head lights, indicators, sidelights, tail lights, and brake lights.

Figure 2:
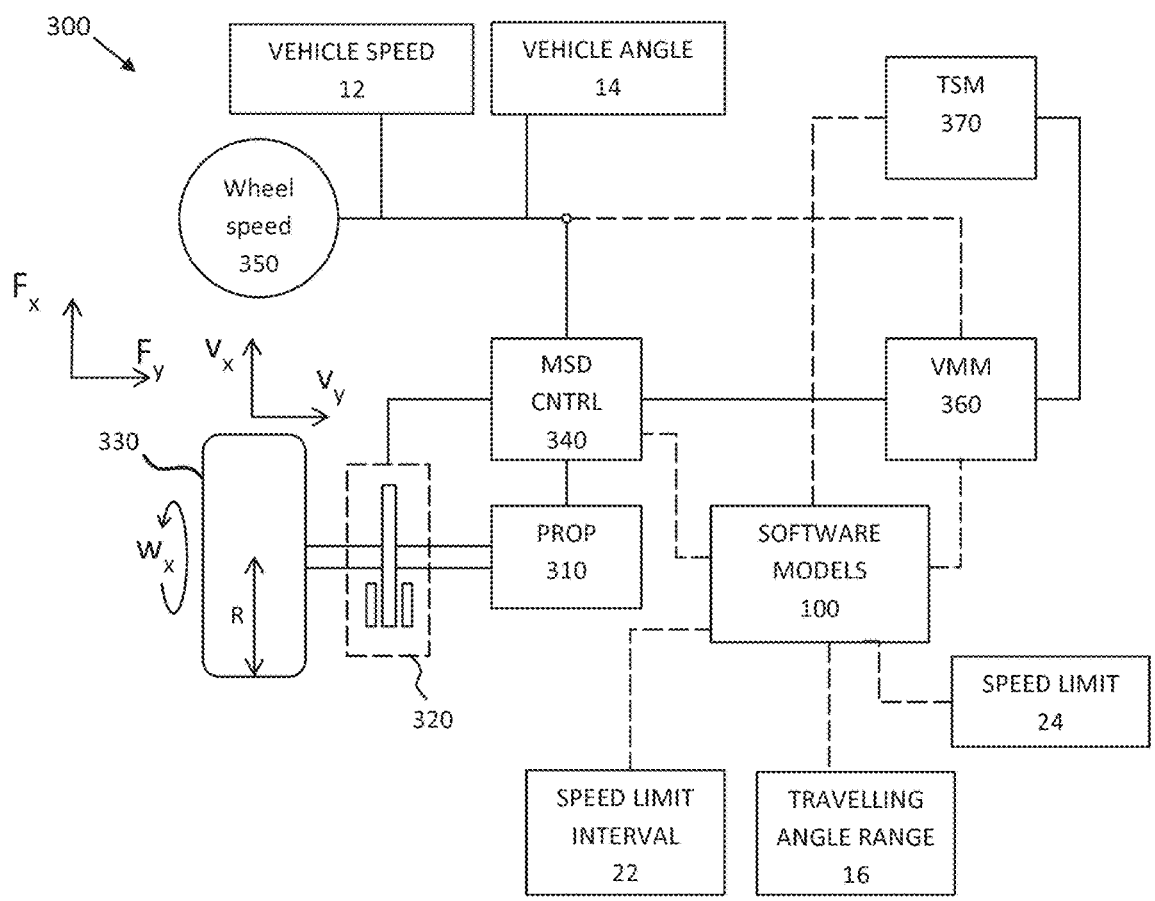
FIG. 2 illustrates an example of an arrangement in a heavy-duty vehicle according to one example.

FIG. 2 schematically illustrates functionality 300 for controlling a wheel 330 by some example MSDs here comprising a friction brake 320 (such as a disc brake or a drum brake, also referred to as 10, 20) and a propulsion device 310 (such as an electric machine or a combustion engine). The friction brake 320 and the propulsion device 310 are examples of wheel torque generating devices, which may also be referred to as actuators and which can be controlled by one or more motion support device control units 340. The control is based on, e.g., measurement data obtained from a wheel rotation speed sensor 350 and from other vehicle state sensors, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 340 may be arranged to control one or more actuators. For instance, an MSD control unit may be arranged to control MSDs for both wheels of an axle. By estimating vehicle unit motion using, e.g., global positioning systems, vision-based sensors, wheel rotation speed sensors, radar sensors and/or lidar sensors, and translating this vehicle unit motion into a local coordinate system of a given wheel (in terms of, e.g., longitudinal and lateral velocity components), it becomes possible to accurately estimate for example wheel slip in real time by comparing the vehicle unit motion in the wheel reference coordinate system to data obtained from a wheel rotation speed sensor 350 arranged in connection to the wheel. Different software models 100 may be used to increase the functionality.

The TSM function 370 plans driving operation with a time horizon of 10 seconds or so. This time frame corresponds to, e.g., the time it takes for the vehicle 100 to negotiate a curve or the like. The vehicle maneuvers, planned and executed by the TSM function, can be associated with acceleration profiles and curvature profiles which describe a desired target vehicle velocity in the vehicle forward direction and turning to be maintained for a given maneuver. The TSM function continuously requests the desired acceleration profiles (areq) and steering angles (or curvature profiles creq) from the VMM system 360 which performs force allocation to meet the requests from the TSM function in a safe and robust manner.

Heavy-duty vehicles 1 are often very heavy, which might make them slow compared to other vehicles on uphill roads and very fast compared to other vehicles in downhill roads. When the vehicle 1 has a substantial difference in speed compared to the other vehicles on the road, it is important to warn other drivers about the potentially hazardous situation. In prior art systems, the driver would have to estimate when the speed is too low/high in relation to the other vehicles and then manually activate the hazard lights.

In the present invention, a method is provided that automatically controls the vehicle hazard lights of the vehicle 1 based on input parameters. These input parameters may for example relate to speed of the vehicle and the travelling angle of the vehicle or the travelling angle of the road.

Figure 3:
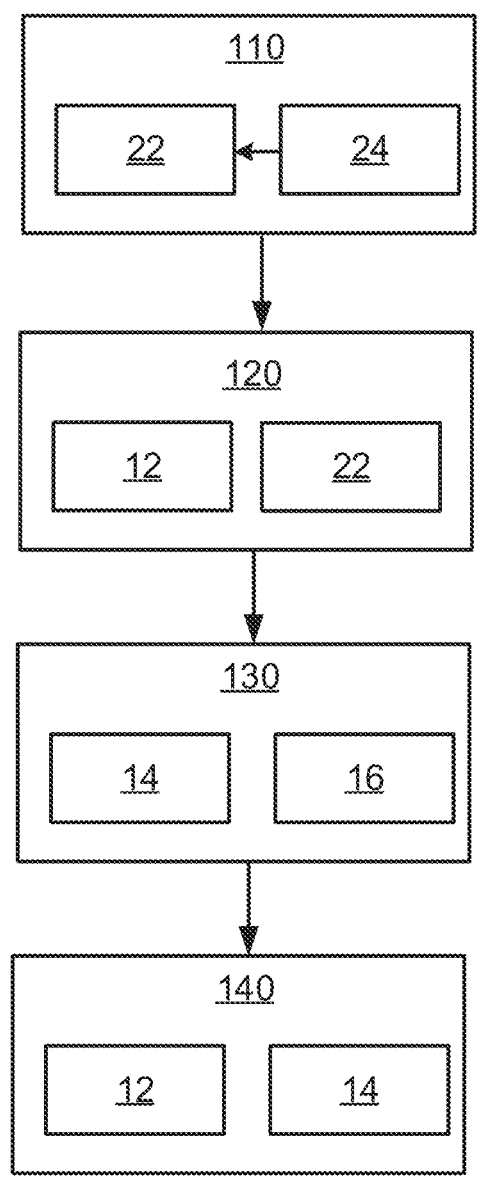
FIG. 3 schematically illustrates a method according to one example.

FIG. 3 illustrates a method for warning road users of a hazardous operating condition of a heavy-duty vehicle 1. The method comprises obtaining 110 a speed limit interval 22 associated with a road on which the vehicle 1 is travelling. The speed limit interval is based on the speed limit 24 of the road on which the vehicle 1 is travelling.

In one example, the speed limit interval 22 may be set as a deviation from the speed limit 24 of the road 20. The speed limit interval 22 may comprise a lower boundary 22a and an upper boundary 22b.

In one example, the speed limit interval 22 is determined as a fixed percentage from the speed limit 24. In another example, the speed limit interval 22 is determined as an adaptable percentage from the speed limit 24, where the percentage may increase or decrease depending on factors such as the speed and/or travelling angle.

In one example, the speed limit interval 22 is determined as a fixed speed value, such as +10 km/hours or −5 km/hours. As one example, if the speed limit is X km/hours, the speed limit interval may range between (X−20) km/hours–(X+10) km/hours, and/or between (X−10) km/hours–(X+5) km/hours.

In another example, the speed limit interval 22 is determined as an adaptable speed value, where the speed value may increase or decrease depending on factors such as the speed and/or travelling angle. The range of the speed limit interval 22 may depend on the travelling speed and/or the travelling angle. The speed limit interval 22 may further depend on factors such as road information, ambient conditions and time as will soon be described further. In one example, the speed limit interval 22 is smaller when the driving speed is above a predefined threshold value. As a non-limiting example, the speed limit interval is 40-80 km/hours for lower speeds and the speed limit interval is between 85-95 km/hours for higher speeds. In another example, the speed limit interval 22 is smaller when the travelling angle range is bigger. As a non-limiting example, the speed limit interval is 60-80 km/hours for travelling angles between −4 to +4%, and the speed limit interval is between 65-75 km/hours for travelling angels between −7 to +7%.

In one example, the value of the speed limit 24 is arranged between the lower boundary 22a and the upper boundary 22b. In one example, the speed limit 24 is the same as either the lower boundary 22a or the upper boundary 22b.

In one example, the speed limit interval 22 is symmetrical around the speed limit 24. In another example, the speed limit interval 22 is asymmetrical around the speed limit 2,4.

As a non-limiting example, a speed limit of 90 km/hours may have a speed limit interval ranging between 75 km/hours-100 km/hours. In another example, the speed limit of 90 km/hours has a speed limit interval ranging between 80 km/hours-100 km/hours. In yet a further example, the speed limit of 90 km/hours has a speed limit interval ranging from 80 km/hours-90 km/hours.

The method may further comprise determining the speed limit 24 of the road.

The speed limit 24 of the road may be determined by a sensor that analyzes the road signs 26, and/or by the vehicle being connected to a navigation service that comprises such information. Navigation services often comprises information relating to the speed limit of the road that the vehicle is currently travelling on.

The method further comprises determining 120 a travelling speed 12 of the vehicle. The method further determines if the travelling speed 12 is outside the speed limit interval 22. In other words, the method comprises determining that a travelling speed of the vehicle 1 is outside the speed limit interval 22.

The travelling speed 12 of the vehicle 1 may be determined using the speed information already available in vehicles 1. This may for example be achieved by a speedometer arranged in the vehicle 1. Vision-based sensor systems and radar systems may also be used to determine vehicle speed over ground.

The method further comprises determining 130 a travelling angle 14 of the vehicle and/or a travelling angle of the road on which the vehicle is travelling. The method further comprises determining if the travelling angle is outside a predetermined travelling angle range 16. In other words, the method comprises determining that a travelling angle 14 is outside a predetermined travelling angle range 16.

In one example, the travelling angle 14 is determined as a percentage. In one alternative example, the travelling angle 14 is determined as a degree. As is known by a person skilled in the art, conversion techniques exists for converting the angle from percentage to degree, and vice versa. For example, a slope of 7% corresponds to a slope of 4.0 degrees. A slope of 5% corresponds to a slope of 2.86 degrees. A horizontal plane is used as a reference, where the angle is 0%. On an uphill road, the inclination is positive and on a downhill road, or downward slope, the inclination is negative.

In one example, the travelling angle is a pitch angle of the heavy-duty vehicle 1 in a travelling direction of the vehicle. Hence, the predetermined travelling angle range is a predetermined pitch angle range.

In one example the travelling angle range 16 ranges between −3% to +3%. In yet one example, the travelling angle range 16 ranges between −7% to +7%. However, as should be understood by a person skilled in the art, other ranges are possible.

In another example, the travelling angle range 16 is determined as an adaptable value, where the angle may increase or decrease depending on factors such as the speed and/or travelling angle. The travelling angle range 16 may further depend on factors such as road information, ambient conditions and time as will soon be described further.

The travelling angle 14 of the vehicle 1 may be determined using angle information already available in the vehicle 1. Such a sensor may for example be a three-dimensional gyro sensor or an acceleration sensor. The acceleration sensor may for example be a gravity sensor. An acceleration sensor may be a three-axis acceleration sensor having an X-, Y- and Z-axis that are perpendicular to each other. In one example, the angle information is obtained from the gearbox having an integrated angle sensor therein.

In one example, the travelling angle of the road may be determined by various sensors arranged in the vehicle 1. Such sensors may for example be Radar or GPS. The sensors are configured to detect an inclination of the road. In one example, the sensor used is a longitudinal accelerometer.

The method further comprises automatically controlling 140 the vehicle hazard lights of the vehicle 1 based on the travelling speed 12 and the travelling angle 14. If it is determined that the travelling speed 12 of the vehicle 1 is outside of the speed limit interval and that the travelling angle 14 is outside the predetermined travelling angle range 16, the method further comprises automatically activating 140 the vehicle hazard lights 30.

In one example, the travelling speed 12 of the vehicle 1 has to be outside of the speed limit interval and that the travelling angle 14 outside the predetermined travelling angle range 16, for a predetermined time before the system activates the vehicle hazard lights 30. Such a time interval may for example be 30 seconds, 60 seconds, 120 seconds, 240 seconds, or any other suitable time period. This may prevent activating the hazard lights 30 if the speed or angle only is temporarily out of range. Hence, the activation of the hazard lights 30 may be made by an offset.

Figure 4:
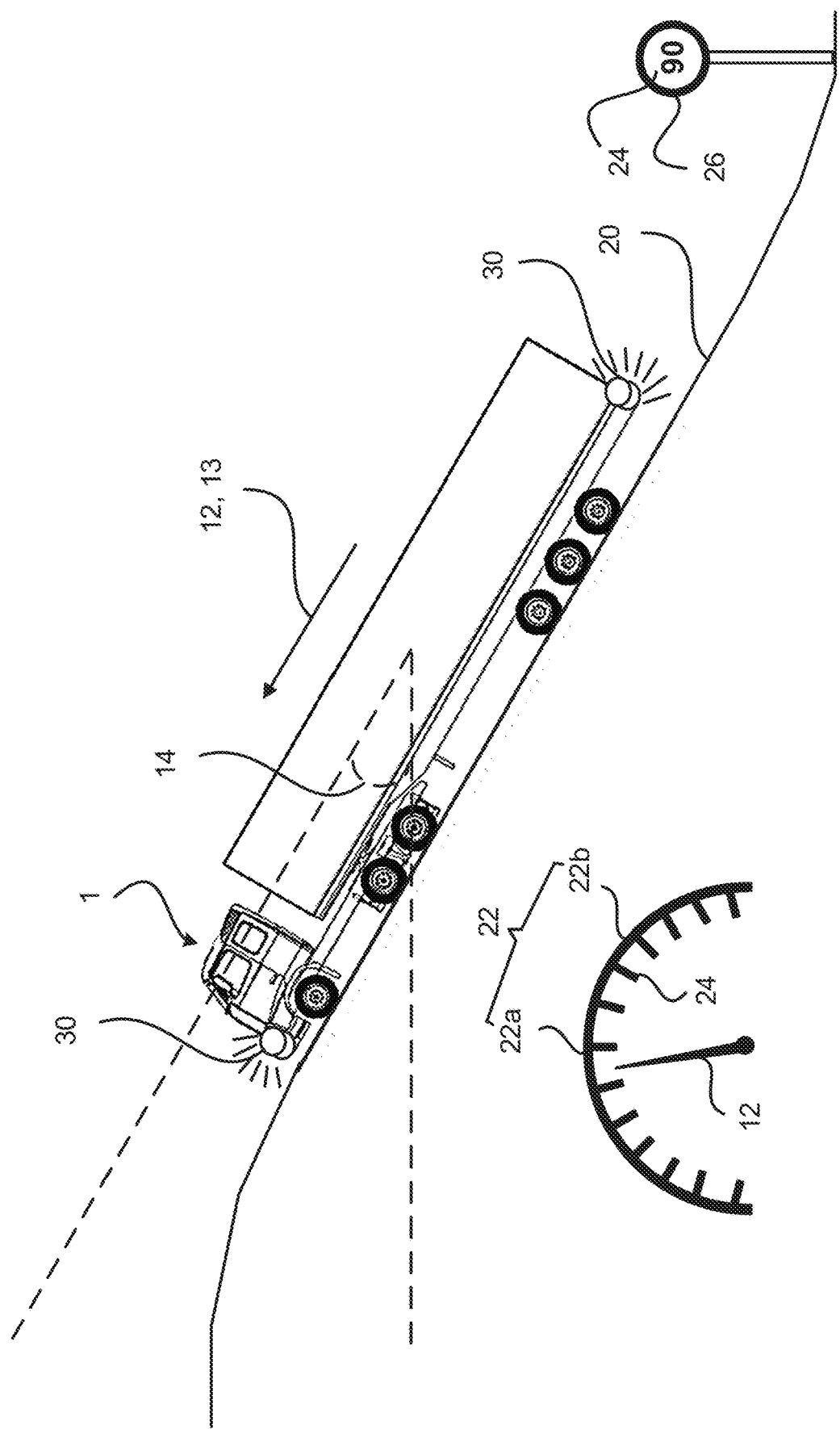
FIG. 4 illustrates an example of a method according to one example.

FIG. 4 illustrates a vehicle 1 that is driving on an uphill road 20. The vehicle 1 is travelling in a travelling direction 13 at a vehicle speed 12. In this specific example, the vehicle 1 is travelling at a speed of 70 km/hours (43.5 miles per hour).

The road has a maximum speed limit 24. The maximum speed limit 24 may be stated on a road sign 26 arranged in conjunction with the road. The maximum speed limit 24 may also be saved in a navigation service 40. In this specific example, the maximum speed limit 24 is 90 km/hours (around 55.9 miles per hour).

In this example, the speed limit interval 22 is set to 70-100 km/hours (43.5-62.1 miles per hour). Hence, the lower boundary 22a is set to 70 km/hours (43.5 miles per hour) and the upper boundary is set to 100 km/hours (62.1 miles per hour).

In one example, the vehicle 1 has a travelling angle 14 on which the heavy-duty vehicle 1 is travelling. In yet one example, the road 20 has a travelling angle 14 at a specific position. In this specific example, the vehicle 1 has a travelling angle 14 in the traveling direction that is 7.5%. In this example the predetermine travelling angle range 16 is set to −7% to +7%.

In the example shown in FIG. 4, the vehicle 1 is travelling at a travelling speed that is lower than the lower boundary 22a of the speed limit interval 22. Moreover, the travelling angle 14 of the vehicle or road is outside the travelling angle range 16. The vehicle 1 is thus travelling at a low speed on an uphill road. The method described herein will thus activate the vehicle hazard lights for the vehicle to warn other drivers about the slow speed of the vehicle 1.

Figure 5:
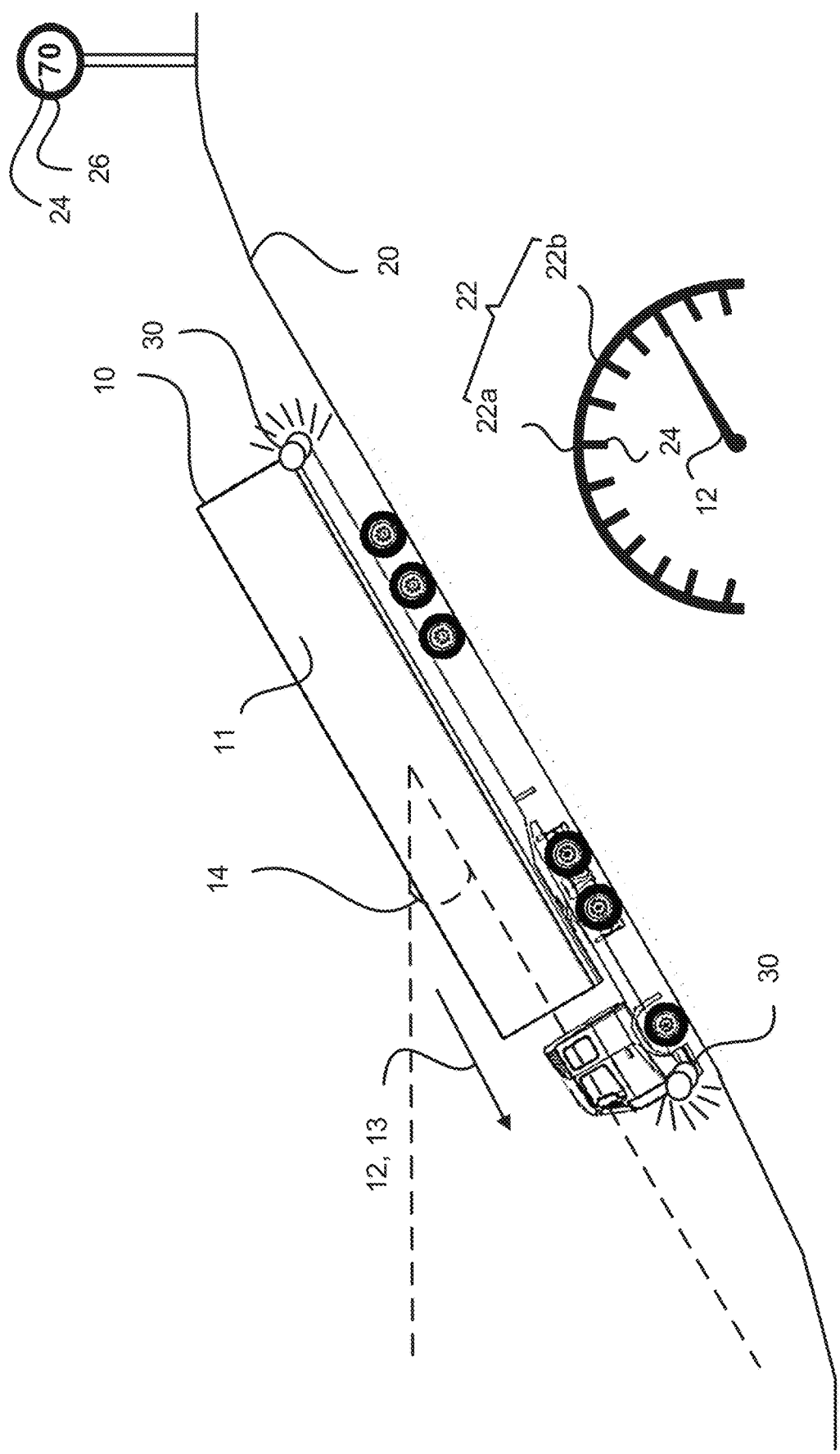
FIG. 5 illustrates an example of a method according to one example.

FIG. 5 illustrates a vehicle 1 that is driving on a downhill road 20. The vehicle 1 is travelling in a travelling direction 13 at a vehicle speed 12. In this specific example, the vehicle 1 is travelling at a speed of 110 km/hours (68.4 miles per hour).

The road 20 has a maximum speed limit 24. The maximum speed limit 24 may be stated on a road sign 26 arranged in conjunction with the road. The maximum speed limit 24 may also be saved in a navigation service 40. In this specific example, the maximum speed limit 24 is 70 km/hours (43.5 miles per hour).

In this example, the speed limit interval 22 is set to 70-90 km/hours (43.5–55.9 miles per hour). Hence, the lower boundary 22a is set to 70 km/hours (43.5 miles per hour) and the upper boundary 22b is set to 90 km/hours (55.9 miles per hour).

In one example, the vehicle 1 has a travelling angle 14 on which the heavy-duty vehicle 1 is travelling. In yet one example, the road 20 has a travelling angle 14 at a specific position. In this specific example, the vehicle 1 has a travelling angle 14 in the traveling direction that is −8%. In this example the predetermine travelling angle range 16 is set to −7% to +7%.

In the example shown in FIG. 5, the vehicle 1 is travelling at a travelling speed that is higher than the lower boundary 22a of the speed limit interval 22. Moreover, the travelling angle 14 of the vehicle or road is outside the travelling angle range 16. The vehicle 1 is thus travelling at a high speed on a downhill road (a road having a negative slope). The method described herein will thus activate the vehicle hazard lights 30 for the vehicle to warn other drivers about the high speed of the vehicle 1.

The method described herein will thus activate the vehicle hazard lights 30 for the vehicle when the vehicle is travelling in a speed higher than the speed limit interval 22 in a negative slope (downhill road) and when the vehicle is travelling in a speed lower than the speed limit interval 22 in a positive slope (uphill road).

The method further comprises deactivating the vehicle hazard lights 30 when the conditions are no longer fulfilled. For example, if the vehicle speed is increasing in an uphill road and/or the slope of the road is decreasing (flattening), the vehicle hazard lights 30 are turned off. As another example, the vehicle speed may be decreasing due to the driver applying the brake, and when the travelling speed is no longer outside of the speed limit interval the vehicle hazard lights are deactivated.

In one example, the travelling speed 12 of the vehicle 1 has to be inside of the speed limit interval and that the travelling angle 14 inside the predetermined travelling angle range 16, for a predetermined time before the system deactivates the vehicle hazard lights 30. Such a time interval may for example be 30 seconds, 60 seconds, 120 seconds, 240 seconds, or any other suitable time period. This may prevent deactivating the hazard lights 30 if the speed or angel only is temporarily inside the range. Hence, the deactivation of the hazard lights 30 may be made by an offset.

Yet another example will now be described. The speed limit of a road is 90 km/hour, the speed limit interval is 80-95 km/hours and the travelling angle range is −3 to +3%. The vehicle is travelling at a travelling speed of 79 km/hour and the travelling angle of the vehicle or road is +4% (i.e., uphill). In this example, the vehicle has a travelling speed that is outside the speed limit interval and the travelling angle is outside the predetermined travelling angle range. Hence, the vehicle hazard lights 30 will be activated.

Another example will be provided. The speed limit of a road is 70 km/hour, the speed limit interval is 60-75 km/hours and the travelling angle range is −3 to +3%. The vehicle is travelling at a travelling speed of 65 km/hour and the travelling angle of the vehicle or road is +4% (i.e., uphill). In this example, the vehicle has a travelling speed that is inside the speed limit interval and the travelling angle is outside the predetermined travelling angle range. Hence, the vehicle hazard lights 30 will not be activated.

Yet a further example will be provided. The speed limit of a road is 70 km/hour, the speed limit interval is 60-75 km/hours and the travelling angle range is −3 to +3%. The vehicle is travelling at a travelling speed of 55 km/hour and the travelling angle of the vehicle or road is +2% (i.e., uphill). In this example, the vehicle has a travelling speed that is outside the speed limit interval and the travelling angle is inside the predetermined travelling angle range. Hence, the vehicle hazard lights 30 will not be activated.

In one example, the method further comprises obtaining information relating to the road, such as for example its condition. Road information pertains to the road on which the vehicle is currently travelling on. Road information may for example relate to the amount of salt on the road, amount of dirt on the road, amount of liquid on the road, temperature of the road and/or the surface of the road. The surface of the road may for example relate to road surface roughness and/or road surface classification. The road surface may be uneven for many reasons, for example due to eroding roads, potholes, gravel road, dirt road, large water puddles on the road, ice and snow on the road, or oil spill on the road. The information relating to road conditions may be received from a remote server 150 being in communication with the vehicle, a global positioning system, weather service and/or navigation service in operative communication with the vehicle, vehicle state sensors such as such as radar sensors, lidar sensors and/or vision based sensors such as camera sensors and infra-red detectors.

The method may additionally or alternatively comprise information relating to the ambient condition of the vehicle. The ambient condition may for example be humidity, temperature and/or precipitation. The humidity may be a current value, a historical value and/or a prediction of upcoming humidity based on weather data. The humidity may account for fog and mist and may also be referred to as moisture. The temperature may be the temperature of the road and/or the temperature surrounding the vehicle. The temperature may be a current value and/or an estimation of upcoming temperature based on weather data. Precipitation may for example be rain, drizzle, sleet, snow, ice pellets, graupel and hail. The information relating to ambient condition may be received from a remote server 150 being in communication with the vehicle, a global positioning system, weather service and/or navigation service in operative communication with the vehicle, vehicle state sensors such as such as radar sensors, lidar sensors and/or vision based sensors such as camera sensors and infra-red detectors.

The method may additionally or alternatively comprise information relating to the time. The time may relate to the time of year, such as the month of the year or the season of the year (spring, summer, autumn, winter). The time of year may affect the precipitation, the lighting conditions, the outdoor temperature, atmospheric humidity and road salting. The time may further relate to the time of the day, such as a specific time or time range (morning, midday/noon, afternoon evening, night). The time of day may affect the precipitation, outdoor temperature, lighting conditions and atmospheric humidity. The information relating to the time may be received from a remote server 150 being in communication with the vehicle or from on-board server of the vehicle.

The method may comprise obtaining information relating to the road conditions, ambient conditions and/or time. This information may be used to directly or indirectly control the activation and deactivation of the hazard lights.

In one example, if the ambient conditions of the vehicle is above a predefined value, the hazard lights will be activated if the other conditions relating to travelling speed and travelling angle are met. In one alternative example, if the ambient conditions of the vehicle is above a predefined value, the boundaries of the speed limit interval are changed. In yet one example, if the ambient conditions of the vehicle is above a predefined value, the boundaries of the predetermined travelling angle range are changed. As should be understood, the ambient condition is just one of several examples.

In yet one example, the information relating to the road, ambient conditions and/or time is used to determine the speed limit interval 22 and the predetermined travelling angle range 16. For example, a wet road may decrease the speed limit interval 22 and/or the predetermined travelling angle range 16.

Figure 6:
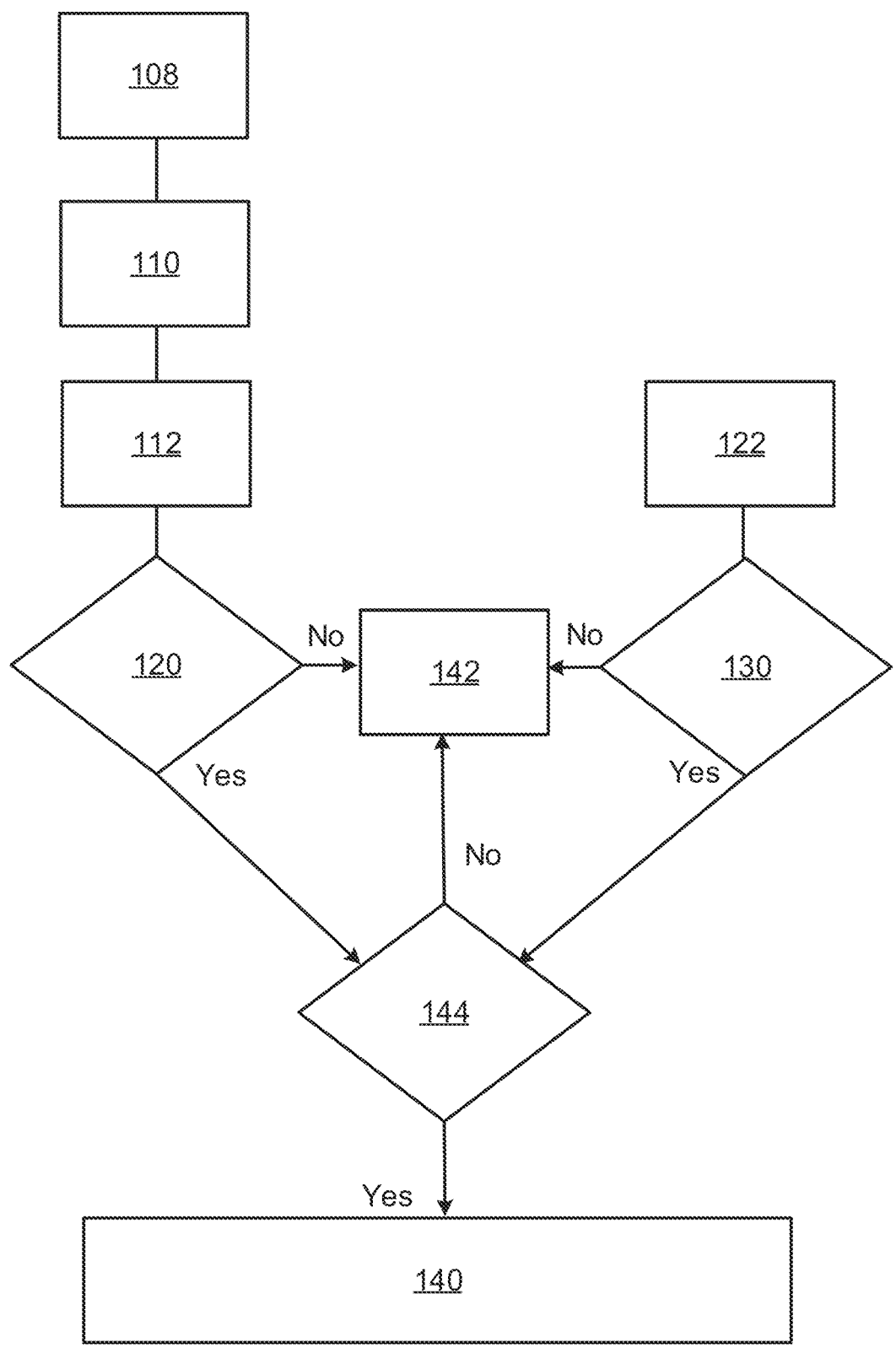
FIG. 6 schematically illustrates a method according to one example.

FIG. 6 illustrates one further example of the method. The method comprises obtaining 108 a speed limit 24 of the road. The method further comprises obtaining 110 a speed limit interval 22 having lower and upper boundaries 22a, 22b based on said speed limit 24. The method further comprises obtaining 112 the travelling speed 12 of the vehicle 1.

The method further comprises determining 120 if the travelling speed of the vehicle 1 is outside of the speed limit interval. If it is determined that the travelling speed 12 of the vehicle 1 is inside the speed limit interval, i.e., that the value of the travelling speed is between the lower and upper boundaries 22a, 22b, no activation of the vehicle hazard lights 30 will be performed. If the vehicle hazard lights are active, the method further comprises deactivating 142 the vehicle hazard lights 30. If it is determined that the travelling speed 12 of the vehicle 1 is outside of the speed limit interval, the method further comprises determining 144 if both conditions 120, 130 are fulfilled.

The method further comprises obtaining 122 a travelling angle of the vehicle and/or of the road 20 in which the vehicle is travelling. The method further comprises determining 130 if the travelling angle 14 is outside a predetermined travelling angle range 14. If it is determined that the travelling angle 14 is inside the predetermined travelling angle range 16, i.e., that the value of the travelling angle is between the lower and upper boundaries 16a, 16b, no activation of the vehicle hazard lights 30 will be performed. If the vehicle hazard lights are active, the method further comprises deactivating 142 the vehicle hazard lights 30.

If it is determined that travelling angle 14 is outside the predetermined travelling angle range 16, the method further comprises determining if both conditions 120, 130 are fulfilled.

If it is determined that both conditions are fulfilled, i.e., that the travelling speed 12 of the vehicle 1 is outside of the speed limit interval and that the travelling angle 14 is outside the predetermined travelling angle range 16, the method further comprises automatically activating 140 the vehicle hazard lights 30.

If it is determined that both conditions are not fulfilled, no activation of the vehicle hazard lights 30 will be performed. If the vehicle hazard lights are active, the method further comprises deactivating 142 the vehicle hazard lights 30.

It should be noted that the steps 108-120 could be performed before or after the steps 122-130, or simultaneously.

In some examples, the driver of the vehicle can override the automatic activation of the vehicle hazard lights 30. Moreover, the driver of the vehicle can turn off the vehicle hazard lights after automatic activation. Additionally, in some examples the driver can manually activate and deactivate the vehicle hazard lights 30.

Figure 7:
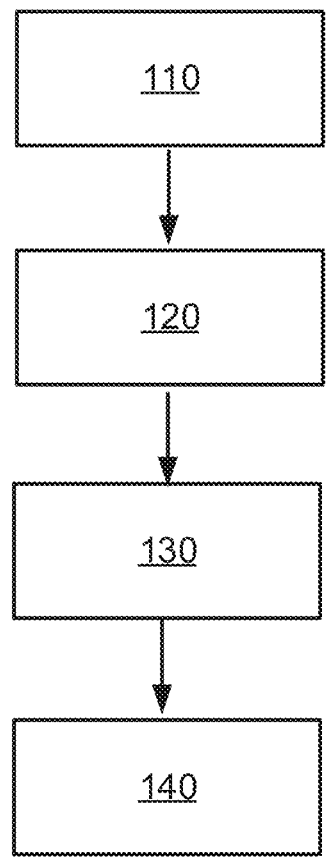
FIG. 7 schematically illustrates a method according to one example.

FIG. 7 is another view of FIG. 3, according to another example. FIG. 7 shows a computer-implemented method for warning road users of a hazardous operating condition of a heavy-duty vehicle 1. The method comprises obtaining 110, by a processor device of a computer system, a speed limit interval 22 associated with a road 20 on which a heavy-duty vehicle 1 is travelling. The speed limit interval 22 is based on a speed limit 24 of the road. The method further comprises determining 120, by the processor device, that a travelling speed 12 of the heavy-duty vehicle 1 is outside the speed limit interval 22, and determining 130, by the processor device, that a travelling angle 14 of the heavy-duty vehicle 1 and/or of the road 20 on which the heavy-duty vehicle 1 is travelling is outside a predetermined travelling angle range 16. The method further comprises automatically controlling 140, by the processor device, said vehicle hazard lights 30 of the heavy-duty vehicle 1 based on the travelling speed 12 and the travelling angle 14.

Figure 8:
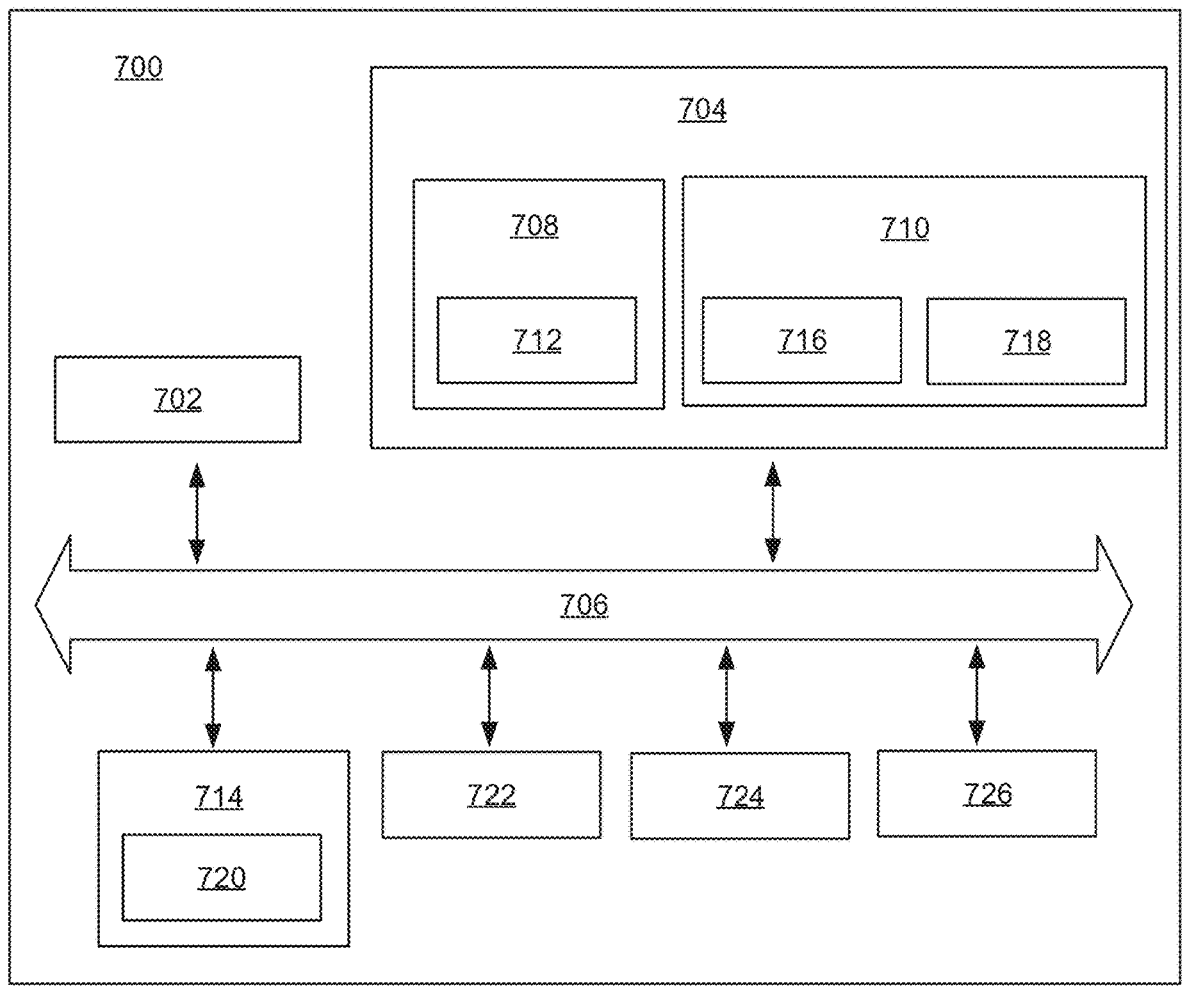
FIG. 8 is a schematic diagram of an exemplary computer system for implementing examples disclosed herein, according to one example.

FIG. 8 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include a processor device 702 (may also be referred to as a control unit), a memory 704, and a system bus 706. The computer system 700 may include at least one computing device having the processor device 702. The system bus 706 provides an interface for system components including, but not limited to, the memory 704 and the processor device 702. The processor device 702 may include any number of hardware components for conducting data or signal processing or for executing computer code stored in memory 704. The processor device 702 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processor device 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with a processor device 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program product 720 stored on a transitory or non-transitory computer-usable or computer-readable storage medium (e.g., single medium or multiple media), such as the storage device 714, which includes complex programming instructions (e.g., complex computer-readable program code) to cause the processor device 702 to carry out the steps described herein. Thus, the computer-readable program code can comprise software instructions for implementing the functionality of the examples described herein when executed by the processor device 702. The processor device 702 may serve as a controller or control system for the computer system 700 that is to implement the functionality described herein.

The computer system 700 also may include an input device interface 722 (e.g., input device interface and/or output device interface). The input device interface 722 may be configured to receive input and selections to be communicated to the computer system 700 when executing instructions, such as from a keyboard, mouse, touch-sensitive surface, etc. Such input devices may be connected to the processor device 702 through the input device interface 722 coupled to the system bus 706 but can be connected through other interfaces such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may also include a communications interface 726 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer system comprising a processor device configured to:
    obtain, by a processor device of a computer system, a speed limit interval associated with a road on which a heavy-duty vehicle is travelling, and wherein the speed limit interval is based on a speed limit of the road;
    determine, by the processor device, that a travelling speed of the heavy-duty vehicle is outside the speed limit interval;
    determine, by the processor device, that a travelling angle of the heavy-duty vehicle and/or of the road on which the heavy-duty vehicle is travelling is outside a predetermined travelling angle range; and
    automatically control, by the processor device, vehicle hazard lights of the heavy-duty vehicle based on the travelling speed and the travelling angle;
    wherein upon determining that the travelling speed of the heavy-duty vehicle is outside the speed limit interval and the travelling angle is outside of the predetermined travelling angle range, the automatically controlling the vehicle hazard lights comprises activating said vehicle hazard lights;
    wherein the vehicle hazard lights are kept active as long as the travelling speed of the heavy-duty vehicle is outside the speed limit interval and the travelling angle is outside a predetermined travelling angle range;
    wherein upon determining that the travelling speed of the heavy-duty vehicle is inside the speed limit interval and/or the travelling angle is inside a predetermined travelling angle range, automatically controlling the vehicle hazard lights comprises deactivating the vehicle hazard lights.

2. A computer-implemented method for warning road users of a hazardous operating condition of a heavy-duty vehicle, wherein the heavy-duty vehicle comprises vehicle hazard lights, the method comprising:
    obtaining by a processor device of a computer system, a speed limit interval associated with a road on which a heavy-duty vehicle is travelling, and wherein the speed limit interval is based on a speed limit of the road;
    determining, by the processor device, that a travelling speed of the heavy-duty vehicle is outside the speed limit interval;
    determining, by the processor device, that a travelling angle of the heavy-duty vehicle and/or of the road on which the heavy-duty vehicle is travelling is outside a predetermined travelling angle range; and
    automatically controlling, by the processor device, the vehicle hazard lights of the heavy-duty vehicle based on the travelling speed and the travelling angle;
    wherein upon determining that the travelling speed of the heavy-duty vehicle is outside the speed limit interval and the travelling angle is outside a predetermined travelling angle range, the automatically controlling the vehicle hazard lights comprises activating said vehicle hazard lights;
    wherein the vehicle hazard lights are kept active as long as the travelling speed of the heavy-duty vehicle is outside the speed limit interval and the travelling angle is outside a predetermined travelling angle range;
    wherein upon determining that the travelling speed of the heavy-duty vehicle is inside the speed limit interval and/or the travelling angle is inside a predetermined travelling angle range, automatically controlling the vehicle hazard lights comprises deactivating the vehicle hazard lights.

3. The method of claim 2, wherein the method further comprises obtaining the speed limit of the road.

4. The method of claim 3, wherein the obtaining of the speed limit of the road comprises capturing and processing images of the road sign for determining the speed limit of the road.

5. The method of claim 3, wherein the obtaining of the speed limit of the road comprises receiving the speed limit of the road from a navigation service.

6. The method of claim 2, wherein the travelling angle is a pitch angle of the heavy-duty vehicle in a travelling direction of the heavy-duty vehicle, and wherein the predetermined travelling angle range is a predetermined pitch angle range.

7. The method of claim 2, wherein the speed limit interval is based on the speed limit of the road, the travelling angle range, ambient conditions of the vehicle and/or condition of the road.

8. The method of claim 2, wherein the travelling angle range is based on the speed limit of the road, the speed limit interval, ambient conditions of the vehicle and/or condition of the road.

9. The method of claim 2, further comprising obtaining information relating to the road, ambient conditions and/or time.

10. The method of claim 2, wherein the automatically controlling the vehicle hazard lights of the heavy-duty vehicle is based on the travelling speed and the travelling angle as well as on the obtained information relating to the road, ambient condition and/or time.

11. The method of claim 2, wherein the speed limit interval is asymmetrical around the speed limit.

12. The method of claim 2, wherein the range of the speed limit interval depends on the travelling speed and/or the travelling angle.

13. The method of claim 2, wherein the range of the travelling angle range depends on the travelling speed and/or the travelling angle.

14. A heavy-duty vehicle comprising a processing device configured to warn road users of a hazardous operating condition of a heavy-duty vehicle, wherein the heavy-duty vehicle comprises vehicle hazard lights, the processing device configured to:
- obtaining by a processor device of a computer system, a speed limit interval associated with a road on which a heavy-duty vehicle is travelling, and wherein the speed limit interval is based on a speed limit of the road;
- determining, by the processor device, that a travelling speed of the heavy-duty vehicle is outside the speed limit interval;
- determining, by the processor device, that a travelling angle of the heavy-duty vehicle and/or of the road on which the heavy-duty vehicle is travelling is outside a predetermined travelling angle range; and
- automatically controlling, by the processor device, the vehicle hazard lights of the heavy-duty vehicle based on the travelling speed and the travelling angle;
- wherein upon determining that the travelling speed of the heavy-duty vehicle is outside the speed limit interval and the travelling angle is outside a predetermined travelling angle range, the automatically controlling the vehicle hazard lights comprises activating said vehicle hazard lights;
- wherein the vehicle hazard lights are kept active as long as the travelling speed of the heavy-duty vehicle is outside the speed limit interval and the travelling angle is outside a predetermined travelling angle range;

wherein upon determining that the travelling speed of the heavy-duty vehicle is inside the speed limit interval and/or the travelling angle is inside a predetermined travelling angle range, automatically controlling the vehicle hazard lights comprises deactivating the vehicle hazard lights.

15. A computer program product comprising program code for performing, when executed by a processing device, warn road users of a hazardous operating condition of a heavy-duty vehicle, wherein the heavy-duty vehicle comprises vehicle hazard lights, the processing device configured to:
- obtaining by a processor device of a computer system, a speed limit interval associated with a road on which a heavy-duty vehicle is travelling, and wherein the speed limit interval is based on a speed limit of the road;
- determining, by the processor device, that a travelling speed of the heavy-duty vehicle is outside the speed limit interval;
- determining, by the processor device, that a travelling angle of the heavy-duty vehicle and/or of the road on which the heavy-duty vehicle is travelling is outside a predetermined travelling angle range; and
- automatically controlling, by the processor device, the vehicle hazard lights of the heavy-duty vehicle based on the travelling speed and the travelling angle;
- wherein upon determining that the travelling speed of the heavy-duty vehicle is outside the speed limit interval and the travelling angle is outside a predetermined travelling angle range, the automatically controlling the vehicle hazard lights comprises activating said vehicle hazard lights;
- wherein the vehicle hazard lights are kept active as long as the travelling speed of the heavy-duty vehicle is outside the speed limit interval and the travelling angle is outside a predetermined travelling angle range;
- wherein upon determining that the travelling speed of the heavy-duty vehicle is inside the speed limit interval and/or the travelling angle is inside a predetermined travelling angle range, automatically controlling the vehicle hazard lights comprises deactivating the vehicle hazard lights.

16. A control system comprising one or more control units configured to warn road users of a hazardous operating condition of a heavy-duty vehicle, wherein the heavy-duty vehicle comprises vehicle hazard lights, the one or more control units configured to:
- obtaining by a processor device of a computer system, a speed limit interval associated with a road on which a heavy-duty vehicle is travelling, and wherein the speed limit interval is based on a speed limit of the road;
- determining, by the processor device, that a travelling speed of the heavy-duty vehicle is outside the speed limit interval;
- determining, by the processor device, that a travelling angle of the heavy-duty vehicle and/or of the road on which the heavy-duty vehicle is travelling is outside a predetermined travelling angle range; and
- automatically controlling, by the processor device, the vehicle hazard lights of the heavy-duty vehicle based on the travelling speed and the travelling angle;
- wherein upon determining that the travelling speed of the heavy-duty vehicle is outside the speed limit interval and the travelling angle is outside a predetermined travelling angle range, the automatically controlling the vehicle hazard lights comprises activating said vehicle hazard lights;
- wherein the vehicle hazard lights are kept active as long as the travelling speed of the heavy-duty vehicle is outside the speed limit interval and the travelling angle is outside a predetermined travelling angle range;

wherein upon determining that the travelling speed of the heavy-duty vehicle is inside the speed limit interval and/or the travelling angle is inside a predetermined travelling angle range, automatically controlling the vehicle hazard lights comprises deactivating the vehicle hazard lights.

17. A non-transitory computer-readable storage medium comprising instructions, which when executed by a processing device, cause the processing device to warn road users of a hazardous operating condition of a heavy-duty vehicle, wherein the heavy-duty vehicle comprises vehicle hazard lights, the processing device configured to:
- obtaining by a processor device of a computer system, a speed limit interval associated with a road on which a heavy-duty vehicle is travelling, and wherein the speed limit interval is based on a speed limit of the road;
- determining, by the processor device, that a travelling speed of the heavy-duty vehicle is outside the speed limit interval;
- determining, by the processor device, that a travelling angle of the heavy-duty vehicle and/or of the road on which the heavy-duty vehicle is travelling is outside a predetermined travelling angle range; and
- automatically controlling, by the processor device, the vehicle hazard lights of the heavy-duty vehicle based on the travelling speed and the travelling angle;
- wherein upon determining that the travelling speed of the heavy-duty vehicle is outside the speed limit interval and the travelling angle is outside a predetermined travelling angle range, the automatically controlling the vehicle hazard lights comprises activating said vehicle hazard lights;
- wherein the vehicle hazard lights are kept active as long as the travelling speed of the heavy-duty vehicle is outside the speed limit interval and the travelling angle is outside a predetermined travelling angle range;

wherein upon determining that the travelling speed of the heavy-duty vehicle is inside the speed limit interval and/or the travelling angle is inside a predetermined travelling angle range, automatically controlling the vehicle hazard lights comprises deactivating the vehicle hazard lights.

* * * * *